United States Patent Office 3,423,480
Patented Jan. 21, 1969

3,423,480
SULFHYDRYL RESINS
Heinz B. Arnold, Minneapolis, and Don E. Floyd, Robbinsdale, Minn., assignors to General Mills, Inc., a corporation of Delaware
No Drawing. Continuation-in-part of applications Ser. No. 397,288 and Ser. No. 397,312, Sept. 17, 1964. This application July 19, 1967, Ser. No. 654,356
U.S. Cl. 260—18                                   11 Claims
Int. Cl. C08g 30/10, 45/06

ABSTRACT OF THE DISCLOSURE

There is disclosed sulfhydryl resins prepared from polymeric fat acids, their method of preparation and the use thereof in curing epoxy resins. The resins are prepared by reacting a hydrosulfide with halohydrin ethers of the alcohol or the halohydrin esters of the dimeric acid or by reacting hydrogen sulfide with the epoxyalkyl ether of the alcohol or the epoxyalkyl ester of the acid. The products are useful for curing epoxy resins for use in adhesives, coatings and sealants.

This application is a continuation-in-part of our co-pending applications Ser. No. 397,288 and 397,312 both filed Sept. 17, 1964, both now abandoned.

This invention relates to sulfhydryl resins, their method of preparation, and to the use thereof in curing epoxy resins. In particular, the present invention concerns the sulfhydryl resins obtained by reacting a hydrosulfide, particularly an alkali metal hydrosulfide, such as NaSH, with the halohydrin ethers of the dimer alcohol of a polymerized fatty acid, or the halohydrin ester of the dimer acid of a polymerized fatty acid or by reacting hydrogen sulfide with the epoxyalkyl ethers of the dimer alcohol of a polymerized fatty acid, or the epoxyalkyl ester of the dimer acid of a polymerized fatty acid.

These sulfhydryl resins are useful as curing agents for epoxy resins providing infusible products having a high degree of flexibility. These converted products find use therefore in areas such as flexible adhesives, coatings, and sealants such as caulking and glazing compounds.

It is therefore an object of this invention to provide sulfhydryl resins of certain epoxyalkyl ethers and/or esters or certain halohydrin intermediates.

It is also an object of this invention to provide a composition of these sulfhydryl resins and epoxy resins.

It is a further object of this invention to provide a method of curing or hardening epoxy resins with the sulfhydryl resins of the present invention.

In brief, the invention involves the preparation of sulfhydryl resin by reaction of certain halohydrin intermediates with a hydrosulfide. These sulfhydryl resins may then be reacted with epoxy resins whereby the epoxy resin is cured or hardened to an infusible and insoluble product having, however, a high degree of flexibility.

The starting materials for the present invention are:
(1) Dimer acid—the dimeric acid obtained from the polymerization of fat acids.
(2) Dimer alcohol—the alcohol corresponding to the dimer acid above.

The dimer acid and dimer alcohol may be defined by the formulae:

Acid: HOOC—D—COOH
Alcohol: HOH$_2$C—D—CH$_2$OH where D is then the divalent hydrocarbon radical of the dimer resulting from the polymerization of monocarboxylic fatty acids having 8–22 carbon atoms. Where the acid being polymerized is an 18 carbon chain acid such as oleic, linoleic or linolenic, a 36 carbon dimer acid is provided and D is therefore a 34 carbon-chain radical, two carbon atoms forming the carboxyl group of the acid and the CH groups when hydrogenated to the alcohol. With other acids and with mixtures of acids of different chain length, the carbon chain length will vary, depending on the statring acids.

As indicated, the dimer acids are one of the starting materials for the products of this invention, which dimer acids are prepared by the polymerization of fatty acids having from 8 to 22 carbon atoms. The reaction product from the polymerization of the acids is a mixture of monomeric, dimeric and higher polymeric forms, these higher polymeric forms generally being referred to as trimeric acids or trimer. The dimeric form or dimer generally predominates and the mixture is sometimes referred to as "dimer acid." If the trimeric form predominates, the mixture is sometimes referred to as "trimer acid." Generically, the appropriate name for the mixture is "polymeric fat acids" which encompasses both species. For the purposes of this invention, the term "dimer acid" will be intended to mean a polymeric fat acid product in which the dimeric form or true dimer acid is present in an amount in excess of 50% by weight and in general, will be present in an amount in excess of 70%. Higher dimer content products in excess of 95% are achieved by fractionation of the polymeric fat acids having a lower dimer content.

The term "polymeric fat acids" as used herein is thus intended to be generic to polymerized acids obtained from "fat acids." The term "fat acids" is intended to include saturated, ethylenically unsaturated and acetylenically unsaturated naturally occurring and synthetic monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acids, both straight chain and branched chain, both monounsaturated and polyunsaturated, are useful monomers for the preparation of the polymeric fat acids. Suitable examples of such materials include 10-undecenoic acid, tariric acid, stearolic acid, behenolic acid and isamic acid.

Because of their ready availability and relative ease of polymerization, the 18 carbon atom unsaturated fatty acids, such as oleic and linoleic acid, are the preferred starting materials for the preparation of the polymeric fat acids, mixtures thereof being found in tall oil fatty acids. Having polymerized the fat acids, the resulting product may then be fractionated, for example, by conventional techniques of distillation or solvent extraction. They may be hydrogenated (before or after distillation) to reduce unsaturation under hydrogen pressure in the presence of a hydrogenation catalyst.

Typical compositions of commercially available polymeric fat acids, based on unsaturated $C_{18}$ fat acids, i.e. tall oil fatty acids, are:

$C_{18}$ monobasic acids ("monomer") 5–15% by weight;
$C_{36}$ dibasic acids ("dimer") 60–80% by weight;
$C_{54}$ (and higher) ("trimer") polybasic acids 10–35% by weight.

The relative ratios of monomer, dimer and trimer (or higher) in unfractionated polymeric fat acids are dependent on the nature of the starting material and the conditions of polymerization. For the purposes of this invention, the term monomeric fat acids refers to the unpolymerized monomeric acids or derivatives present with the polymeric fat acids. As indicated earlier, the term dimeric fat acids refers to the dimeric form of acids or other derivatives (formed by the dimerization of two fat acid molecules), and the term trimeric fat acids refers to the residual higher polymeric forms consisting primarily of the trimeric form of acids or derivatives, but containing some higher polymeric forms.

For the purposes of this invention, the terms monomeric, dimeric and trimeric fat acids, are defined further by a micromolecular distillation analytical method. The method is that of Paschke, R. F., et al., J.A.O.C.S. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

These polymeric fat acids may be converted to the alcohols by hydrogenation, thereby providing glycols having the same number of carbon atoms as the polymeric fat acid. If the dimer acid is hydrogenated, the corresponding diol is provided. In the case of the trimeric form, the triol would be provided. The hydrogenation may be carried out in any ordinary high pressure hydrogenation equipment by either static or continuous methods. A hydrogenation catalyst is necessary, the complex copper chromite catalysts generally being the most desirable although other catalysts such as zinc chromite catalysts may be employed. In general, a reaction temperature of 200–250° C. and a hydrogen pressure of 100–500 atmospheres is employed. For further illustration of the preparation of these alcohols, and also the preparation of the polymeric fat acids, reference may be had to U.S. Patent 3,347,562.

The starting material, the dimeric fat acid or alcohol, is then converted to the halohydrin ester or ether. This is accomplished by reaction with an epihalohydrin, such as epichlorohydrin. Epihalohydrins useful in preparing the halohydrin intermediates thus include epichlorohydrin, epibromhydrin and epiiodohydrin, and are preferably in alpha form. The latter materials are all characterized by a three carbon chain; however, analogs of the aforesaid epihalohydrins may also be used. Examples of the latter are beta- and gamma-methyl epichlorohydrins, 1,4-dichloro-2,3-epoxy butane; etc. In view of its availability and relatively low cost, epichlorohydrin is preferred.

Condensing catalysts are used in reacting an epihalohydrin with a dimer acid or alcohol, for the formation of a halohydrin ether or halohydrin ester composition. Typical catalysts are those of the Friedel-Crafts type, including anhydrous $AlCl_3$, $BF_3$, $ZnCl_2$, $FeCl_3$, $SnCl_4$, and complexes such as the well known $BF_3$ etherates, etc.; acid type catalysts including HF, $H_2SO_4$, $H_3PO_4$, etc.; basic type catalysts such as benzyl trimethyl ammonium hydroxide, dimethyl benzylamine, tri(dimethylaminomethyl)phenol, others such as $SbCl_5$, etc. Concentration of catalyst may be varied, depending upon the individual catalyst. For example, from about 0.1% to about 0.2% of $BF_3$ or complex thereof, based upon the total quantity of reactants provide satisfactory results. In general, the converting catalyst is used in small concentration, up to about 5% but generally less than 1% of the total reactants, particularly when $BF_3$ type catalysts are employed. With certain of the less active catalysts, i.e., $SbCl_5$ etc., larger amounts may be used to advantage.

The halohydrin products are advantageously formed by reacting the epihalohydrin and the dimeric fat acid product in the presence of a suitable condensing catalyst, at a temperature between about 25° C. and about 125° C. Temperatures of the order of 25° C. generally provide a slow reaction rate, unless relatively large concentrations of catalysts are used. Most satisfactory results, that is, an adequate rate of reaction and light color of product, are obtained with temperatures in the neighborhood of 100° C. when it is desired to form the halohydrin intermediate of dimeric fat acid using an alkaline catalyst. Formation of the halohydrin intermediate of dimer fat alcohol is best achieved at a maximum temperature of 60–65° C. using an acid catalyst.

Condensation of the dimer alcohol with the epihalohydrin can be carried out by dropwise addition of the epihalohydrin to the mixture of catalyst and dimer alcohol. Condensation is relatively slow initially, becoming more rapid as the temperature rises due to the liberation of heat. Generally, the temperature rises appreciably so that efficient cooling must be applied to prevent violent reaction. A preferred method involves adding an alkaline catalyst to the alcohol and then adding the epihalohydrin thereto, gradually allowing the temperature to reach about 100° C. This provides a more uniform product and greater control over the reaction. Inasmuch as the reaction is exothermic, cooling can be applied to shorten the time required for the addition of the epihalohydrin. By proper adjustment of the rate of cooling and rate of addition of the epihalohydrin, the reaction can be carried out at the desired temperature in a minimum period of time. The condensation may be effected in the presence or absence of suitable solvents or diluents.

Condensation of the dimeric fat acid and epihalohydrin is preferably carried out by heating a mixture of the dimeric fat acid, epihalohydrin and catalyst to about 100° C. and holding the reaction mixture at this temperature for several hours with stirring.

Ideally these halohydrin intermediate from epichlorohydrin may be represented by the following formulae:

(1) Halohydrin esters of dimer acid

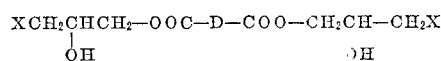

where D is as previously defined and X is a halogen atom such as chlorine.

(2) Halohydrin ether of dimer alcohol

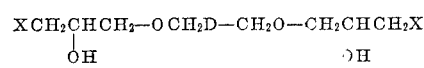

where D and X are as previously defined.

These halohydrin intermediates are then converted to sulfhydryl resins by reaction with a hydrosulfide such as NaSH. Other hydrosulfides include KSH, $Ca(SH)_2$, $Ba(SH)_2$, $NH_4SH$, $Sr(SH)_2$. The alkali metal hydrosulfides, particularly sodium hydrosulfide, are preferred.

The hydrosulfide is generally added slowly at room temperature and reaction occurs at a temperature between room temperature, about 25° C., and about 100° C. The hydrosulfide is generally employed in an amount equivalent to the active chlorine content of the halohydrin intermediate. An excess, up to about 75%, may be employed, however.

The reaction is exothermic but generally only a slight exotherm is noted and in most cases the reaction temperature will not exceed 60°. External heating may be necessary in some cases, however. The reaction may be carried out at elevated pressure or at atmospheric pressure, and the product is recovered by extraction with a suitable solvent and removal of solvent at reduced pressure.

Alternatively the resins may be prepared by proceeding through epoxyalkyl derivative with $H_2S$ rather than the halohydrin derivative. In this method the halohydrin must first be converted into the epoxyalkyl derivative.

To convert to the epoxyalkyl derivative the halohydrin product is then treated with an alkaline material to dehydrohalogenate the product. This treatment may be accomplished by adding the alkaline material to the reaction mixture obtained in the above-described process, or the condensation product may be recovered from the reaction mixture by any suitable means, such as distillation, extraction, and the like, before it is combined with the alkaline material. Any of the known dehydrohalogenating materials may be used in this reaction, such as sodium and potassium hydroxide, sodium and potassium carbonates and bicarbonates, borax, hydroxides of magnesium, zinc, lead, iron and aluminum, and the corresponding oxides, etc. The aluminates, silicates and zincates or alkali salts, such as sodium and potassium aluminate and sodium and potassium zincate, are particularly good dehydrohalogenating agents when used in substantially, or completely, nonaqueous media.

The amount of the dehydrohalogenating agent used will vary, depending on the number of groups to be dehydrohalogenated. At least one mole of the agent should be employed for every halohydrin group to be converted to an epoxy group. In most cases, the dehydrohalogenating agent may be applied to the halohydrin as an aqueous solution or suspension or dissolved in an inert solvent, such as ethers, esters, hydrocarbons, and the like. If the above-noted aluminates, silicates or zincates are used as the alkaline material, the dehydrohalogenation is preferably effected in a non-aqueous medium and the salts as by themselves or dissolved in organic solvents or diluents. Carbon tetrachloride, 1,4-dioxane and dichloroethyl ether are particularly satisfactory as solvents for this purpose.

Epichlorohydrin may also be employed as the solvent or diluent for the dehydrohalogenation. This permits the use of caustic alkali, sodium hydroxide, as the dehydrohalogenating agent without objectionable further reaction or with a minimum of further reaction during or after the formation of the glycidyl ethers. The sodium hydroxide is employed in an amount equivalent to or slightly in excess of the active chlorine of the chlorohydrin. Active chlorine is defined by the chlorine on a carbon atom adjacent to a carbon atom containing a hydroxyl group.

With the dimeric fat acid, the glycidyl esters are most easily prepared by the reaction of alkali metal salts of the dimeric fat acids with an epihalohydrin at elevated temperatures. As indicated earlier in the description of the halohydrin ethers of the alcohol, epichlorohydrin is preferred. The salts are prepared by merely mixing and reacting the acid with potassium hydroxide or sodium hydroxide in an inert medium such as water, alcohol, benzene or the like. Thereafter, the liquid medium is separated and the salt of the acid is recovered.

The salt is then reacted with epichlorohydrin at temperatures from 85 to about 115° C. Higher temperatures may be employed but may require along therewith the use of a pressure vessel. Temperatures of the order of 95 to 105° C. are generally preferred. A catalyst may be employed such as the various quaternary ammonium salts such as described earlier hereinabove with regard to the alcohol.

At least one mole of epihalohydrin is employed for each —COOM group when M is alkali metal and it is generally preferred to employ an excess of from 0.5 to 2 moles. The reaction generally requires from ½ to about 2 hours for completion, after which the alkali metal halide is filtered off and the excess epihalohydrin stripped, leaving the glycidyl ester product as the residue.

Ideally the preferred glycidyl products from which the sulfhydryl resins are prepared may be represented by the following formulae:

(1) Glycidyl esters of the dimeric fat acid

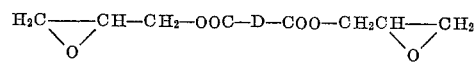

and (2) Glycidyl ether of the dimeric fat alcohol

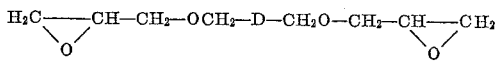

where D is as previously defined.

The epoxyalkyl derivatives are then converted to sulfhydryl resins by reaction with hydrogen sulfide. The $H_2S$ is employed in an amount of from one to ten moles per equivalent of oxirane in the glycidyl derivative. An excess is preferred of from two to four. The reaction is preferably conducted in the presence of an alkaline catalyst, such as alkali metal (sodium or potassium) hydrosulfides, alkoxides (methoxide or ethoxide), phenoxides, or hydroxides; amino compounds, such as alkylene polyamines (ethylene diamine or diethylene triamine) di- or tri-alkyl amines (methyl or ethyl) pyridine, piperidine, dicyandiamide or melamine. The catalyst will be employed in from 0.001% to 5% by weight and preferably from 0.1% to 1.0% by weight.

The reaction may be conducted at atmospheric pressure or superatmospheric pressures. At atmospheric pressures portions of the $H_2S$ are bubbled through the glycidyl product for a short period and the mixture then allowed to stand for a time before another portion of $H_2S$ is added. Pressure operation, however, is preferred. The $H_2S$ may be added all at one time under pressure or injected periodically into the pressure vessel. Pressures within the range of 50–300 p.s.i., are preferred. However, higher pressures up to 2000 p.s.i. may be employed.

The temperature employed in the reaction may vary from —15° C. to about 150° C. Generally from 20° C. up to about 125° C. will be employed with room temperature to about 100° C. being preferred. The reaction may be conducted in the presence or absence of solvents or diluents. Suitable solvents include toluene, benzene cyclohexane, dioxane, alcohols such as ethanol, propanol, or butanol, tetrahydrofuran, diethyl ether, dibutyl ether and mixtures of the foregoing.

The sulfhydryl products prepared from the epichlorohydrin route would ideally be represented as follows:

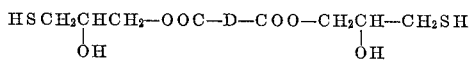

or

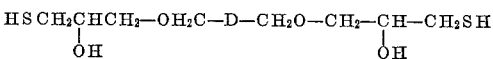

where D is as previously defined. Where other halohydrins are employed the group

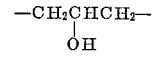

will of course be different dependent on the particular halohydrin employed. In general this group may be represented as —R— where R is a hydroxyl substituted divalent alkylene radical preferably having from 3–6 carbon atoms. Illustrative R groups are

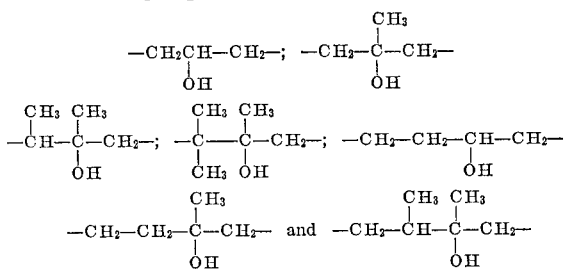

Accordingly, the sulfhydryl or dithiol product may ideally be represented as

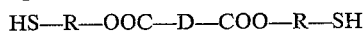

or

where D is the divalent hydrocarbon radical of the dimer of a monocarboxylic acid having 8 to 22 carbon atoms and R is a divalent alkylene radical having from 3–6 carbon atoms.

The invention can best be illustrated by means of the following examples showing the preparation of the various halohydrin intermediates and the preparation of the sulfhydryl resins therefrom.

EXAMPLE I

Into a three-necked, round-bottom flask, equipped with a stirrer, thermometer and air condenser, were placed 1134 grams of dimerized tall oil fatty acids, 406 grams (4.0 moles plus 10% excess) distilled epichlorohydrin and 23.4 grams of benzyl trimethyl ammonium hydroxide (50% in methanol). The dimerized tall oil fatty acids had the following analysis:

| | | |
|---|---|---|
| Monomer (M) | percent | 5.7 |
| Dimer (D) | do | 75.4 |
| Trimer (T) | do | 18.9 |
| Acid value (A.V.) | | 189.2 |
| Saponification value (S.V.) | | 197.9 |

The mixture was heated with stirring at about 100° C. for 7.5 hours, after which time excess epichlorohydrin was removed by vacuum (water aspirator, 29 in. Hg). Analysis of the chlorohydrin ester showed a total chlorine content of 10.0±1%.

EXAMPLE II

In the same manner as Example I above another chlorohydrin ester of dimerized tall oil acids was prepared, using 203 grams (2 moles+10% excess) epichlorohydrin, 11.7 grams of benzyl trimethyl ammonium hydroxide (40% in methanol) and 556 grams of the distilled dimerized tall oil fatty acids having the following analysis:

| | | |
|---|---|---|
| M | percent | 0.7 |
| D | do | 97.8 |
| T | do | 1.5 |
| A.V. | | 193.1 |
| S.V. | | 198.5 |

Analysis of the chlorohydrin ester showed a total chlorine content of 10.5±0.1%.

EXAMPLE III

The product of Example I (110 grams), 27 grams of NaSH·H$_2$O and 100 cc. of dimethyl formamide were charged into an autoclave. Then 72 grams of gaseous HS was added under pressure from a pressurized cylinder. The sealed autoclave was heated to 40–50° C. and held at this temperature with rocking for 4 hours. The autoclave and contents were rapidly cooled to room temperature and the reaction mixture was allowed to remain in the bomb under H$_2$S pressure overnight at room temperature. After venting the autoclave, the reaction mixture was poured into 1 liter distilled water and the oil:water mixture was extracted with chloroform. The chloroform extracts were then washed with water (until wash water was neutral), dried over anhydrous MgSO$_4$ and filtered. The sulfhydryl product was isolated by stripping off the chloroform at reduced pressure. Analysis of the sulfhydryl product showed 6.2% SH and 7.3% sulfur.

EXAMPLE IV

The product of Example II (113 grams), 34 grams of NaSH·H$_2$O and 100 cc. of dimethyl formamide were charged into an autoclave to which was added 98 grams of gaseous H$_2$S under pressure from a pressurized cylinder. The autoclave was heated with rocking for 3 hours at 70–80° C. after which it was cooled rapidly to room temperature, vented, and the product then isolated as in Example III. Analysis of the sulfhydryl product showed 6.0% SH, 8.1±0.2% sulfur, and 0.07% chlorine.

EXAMPLE V

In the same manner as Example III, a sulfhydryl resin was prepared employing 110 grams of the product of Example I, 27 grams of NaSH·H$_2$O, 100 ml. dimethyl formamide and 83 grams of gaseous hydrogen sulfide. Heating was conducted for 2 hours at 50–60° C. and a maximum pressure of 250 p.s.i.g. Analysis of the sulfhydryl product showed 6.36% SH, 8.36±0.1% S and 0.34±0.07% Cl.

As indicated earlier hereinabove, the sulfhydryl resins of the present invention are useful in the curing of epoxy resins. The epoxy resins which may be employed are materials possessing more than one vicinal epoxy group, i.e., more than one

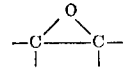

group. These compounds may be saturated or unsaturated, aliphatic, cycloaliphatic, aromatic or heterocyclic, and may be substituted, if desired, with non-interfering substituents such as chlorine, hydroxyl groups, ether radicals and the like. In general it is preferable that the epoxy compound contain terminal epoxide groups. The epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

Suitable epoxy resins include the reaction products of polyhydric phenols with polyfunctional halohydrins. Typical polyhydric phenols useful in the prepartion of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl) propane (Bisphenol A), the resin having the following theoretical structural formula:

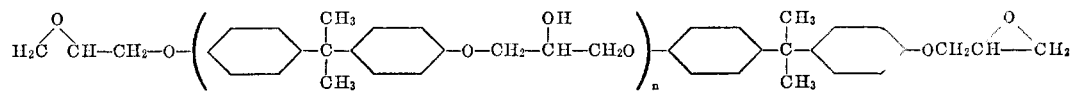

where *n* is 0 or an integer up to 10. Generally speaking, *n* will usually be no greater than 3 or 4, and may be 1 or less. However, other types of epoxy resins may be employed.

Another of such epoxy resins are those which are the reaction product of epichlorohydrin and bis (p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins, as described earlier hereinabove. In addition, the glycidyl esters are also commercially available epoxide materials. As the polymeric fat acids are composed largely of dimeric acids, the glycidyl esters thereof may be represented by the following theoretical, idealized formula:

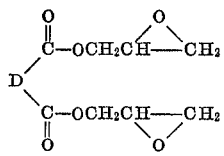

where D is as previously defined. Glycidyl esters of other polybasic acids, such as phthalic and sebacic acids, may be employed.

Other types of epoxy resins which may be used in the present invention and which are commercially available epoxy materials are the polyglycidyl ethers of tetraphenols which have two hydroxyaryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxy-phenyl) alkanes, such as 1,1,2,2-tetrakis (hydroxyphenyl) ethane, 1,1,4,4-tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

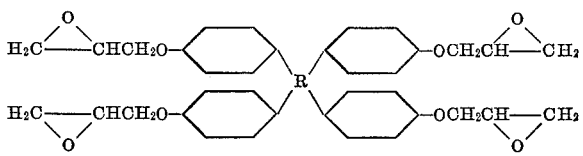

wherein R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following theoretical, idealized formula:

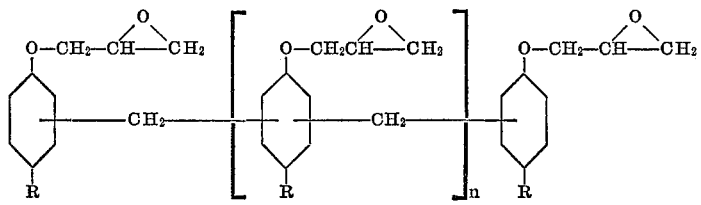

where R is selected from the group consisting of hydrogen and alkyl groups having up to 18 carbon atoms, and *n* is an integer of from 1 to 10. Generally, *n* will be an integer in excess of about 1 to 5.

In general, these resins are obtained by epoxidation of the well-known novolac resins. The novolac resins, as is known in the art, are produced by condensing the phenol with formaldehyde in the presence of an acid catalyst, although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally referred, but not essential that the alkyl substituent be linked to the para carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

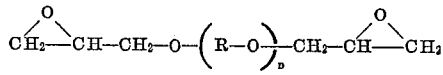

where R is an alkylene radical having from 2–5 carbon atoms and *n* is an integer of from about 1 to about 50. R is preferably ethylene or propylene or mixtures thereof and *n* is preferably about 3 to about 10. It is understood that *n* represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In using these sulfhydryl resins with the epoxy resins, a catalyst is generally employed as is customary with polysulfide-epoxy resin curing. A list of such catalysts is described in "High Polymers," edited by Norman G. Gaylord, Interscience Publishers, 1962, p. 197, vol. XIII, part III. Illustrative of some of the most usual catalysts employed are tri(dimethylaminomethyl)phenol (DMP–30), dimethyl amino methyl phenol (DMP–10); benzyl diethyl or dimethyl amine; alkylene diamines or polyamines, such as ethylene diamine, diethylene triamine, dimethylaminopropyl amine; amines such as diethylamine, triethylamine, triethanolamine; acid catalysts such as phthalic anhydride, pyromelletic dianhydride, boron trifluoride; and polymeric catalysts such as the polyaminoamides of polymeric fat acids and alkylene polyamines. For convenience of illustration and to enable comparison of the various products in the following data on the curing of epoxy resins, DMP–30 was used as the catalyst in an amount of 10% by weight based on epoxy resin employed, unless otherwise noted, and the epoxy resin being cured was a Bisphenol A-epichlorohydrin product having an epoxy equivalent weight of about 190. The appropriate amounts of sulfhydryl resin, epoxy resin and catalyst were thoroughly blended at room temperature and poured into a 3.5 inch diameter petri dish coated with a silicone release agent. The resin blend was then heat cured at 120–

130° C. in a forced draft oven. The physical properties were then evaluated with the results seen in the following Table I:

TABLE I

| Sulfhydryl resin of example | Ratio of sulfhydryl to epoxy resin [1] | Gel time, 120° C. (min.) | Shore A [2] hardness | At room temp. | | At −25° C. | |
|---|---|---|---|---|---|---|---|
| | | | | Tensile,[3] p.s.i. | Elongation,[2] Percent | Tensile,[3] p.s.i. | Elongation, Percent |
| III | 2.5:1 | 8 | 68 | 71.1 | 214.7 | 2037 | 5.3 |
| IV | 2:1 | 10 | 58 | 60.1 | 258.0 | 1220 | 4.6 |
| V | 2:1 | 5 | 65 | 974 | 201.5 | | |

[1] 10% tri(dimethylaminomethyl)phenol employed based on weight of epoxy resin employed.
[2] ASTM D-1709-59T.
[3] ASTM D-1708-59T.

The following best illustrates the invention with sulfhydryl resins prepared from the various epoxyalkyl derivatives showing the preparation of the various glycidyl derivatives and the preparation of the sulfhydryl resins therefrom.

EXAMPLE VI

There was dissolved in 250 ml. of cyclohexane 300 grams of a commercially available diglycidyl ester of the dimer acid of tall oil fatty acids (X-71 supplied by Shell Oil Company) having an oxirane oxygen content of 3.71%. The solution was placed in a rocking autoclave and 1.0 gram of sodium methoxide added. Hydrogen sulfide gas (90 grams) was then introduced. The sealed autoclave was then rocked at ambient room temperature (26–30° C.) for 27 hours during which time the pressure dropped from 90 p.s.i.g. to 60 p.s.i.g. After venting the autoclave, the reaction mixture was filtered to remove suspended catalyst and the solvent was stripped under reduced pressure (30 in. Hg at about 45° C.). The final product which was recovered was a clear fluid resin (322 grams) having a Brookfield viscosity at 26° C. of 96 poises and a sulfur content of 6.9. Infrared analysis confirmed the presence of expected hydroxyl and sulfhydryl groups.

EXAMPLE VII

There was placed in a rocking autoclave 498 grams of the same diglycidyl ester employed in Example VI and 1.0 gram of sodium methoxide. To this blend was added 106 g. of hydrogen sulfide gas. The unit was then sealed and rocked at 27° C. for 27 hours during which time the pressure dropped from 120 p.s.i.g. to 90–100 p.s.i.g. After venting the autoclave about 350 ml. chloroform was added to the reaction mixture to facilitate work-up. The solution was filtered to remove suspended solid and the solvent stripped off under reduced pressure (25–28 in. Hg vacuum). The final product, similar in appearance to that in Example VI, weighed 540 g. Brookfield viscosity at 26° C. was 57–58 poises and sulfur content 7.12%. Infrared analysis was practically identical with that observed for the product in Example VI. Another preparation practically identical with the above produced 541 g. of thiol resin with a Brookfield viscosity of 55–56 poises at 26.5° C. and a sulfur content of 7.1%. A third preparation essentially identical with the above produced 520 g. of thiol resin having a sulfur content of 7.05% and a sulfhydryl content (SH) of 6.81%.

EXAMPLE VIII

The same diglycidyl ester employed in Example VI (300 grams) was warmed to 60–70° C. and $H_2S$ bubbled through the warm resin at atmospheric pressure for about 7 hours. The resin was allowed to cool to room temperature and 10 drops of tri(dimethylaminomethyl) phenol were added. Hydrogen sulfide gas was slowly bubbled through the resin for an additional 6.5 hours, during which time the resin temperature rose to 43° C. After cooling to room temperature, the resin was degassed at reduced pressure. The product on analysis had a sulfur content of 5.6%.

EXAMPLE IX

A blend of 200 pounds of the dimer acid obtained from the polymerization of tall oil fatty acids, 175 pounds of 4-methyl pentanol-2, 2 pounds of p-toluene sulfonic acid and 50 pounds of toluene were refluxed at 125° C. for about four hours. The water formed was removed during the reaction. The ester was then washed and stripped of solvent and had the following analysis: Saponification Value, 155.5; Acid Value, 0.65.

The ester was then reduced to the alcohol following essentially the method described in Ind. & Eng. Chem., vol. 39, 1947, page 55. The crude dimer alcohol was fractionated and a fraction collected having an average hydroxyl value of 183, which was employed in the subsequent reaction.

There was blended with stirring 1,212 grams (2.0 moles) of the dimer alcohol fraction from above and 370 grams (4.0 moles) of epichlorohydrin, and 1 cc. of $BF_3$ etherate was added. Over a period of about 3 hours the reaction temperature rose to 35° C. (due to exotherm only). At this point another 1 cc. of $BF_3$ etherate was added and the reaction temperature rose to 65° C. within 1 hour. At this point the reaction mixture was cooled and the chlorohydrin ether product recovered which had an active chlorine content of 7.69% (theoretical 8.98%).

To a blend of 92.5 grams (1.0 mole) of epichlorohydrin and 1,562 grams (1.69 moles) of the above chlorohydrin ether product was added a solution of 2 grams of NaOH in 10 cc. of $H_2O$. Then with stirring, a total of 135 grams of powdered NaOH was added in about 8 equal portions over a period of about 1.5 hours. The reaction temperature gradually rose to a maximum of 55° C. during this time. After cooling to room temperature, the reaction mixture was filtered and the epichlorohydrin stripped off under reduced pressure at a temperature of 78° C. The product was filtered to provide a clear, fluid diglycidyl ether having an oxirane oxygen content of 3.45%.

To 500 grams of the above diglycidyl ether of dimer alcohol was added 1.0 gram of sodium methoxide catalyst. The reaction mixture was placed in a pressure vessel and a total of 100 grams of hydrogen sulfide gas was introduced into the vessel under pressure from a pressurized cylinder. The autoclave was rocked for 24 hours at room temperature. After venting to remove excess $H_2S$, the reaction mixture was dissolved in about 2 liters of cyclohexane, the solution was filtered and the cyclohexane removed under reduced pressure. The product, a fluid orange colored resin having a viscosity at 24° C. of 63 poises, had a sulfur content of 6.0% and an SH content of 4.26%.

In the same manner as the first described sulfhydryl products, epoxy resins can be cured with these products.

EXAMPLE X

A blend was prepared at ambient room temperature of the following resins: 25 g. of a fluid dithiol resin (Ex. VI), 50 g. of a Bisphenol A-epichlorohydrin epoxy having epoxy equivalent weight of about 190, and 5 g. of tri(dimethylaminomethyl) phenol. The fluid resin blend gelled within 8 minutes after blending. Temperature at gel was 69° C., and maximum exotherm was 100° C. This cured blend had a Barcol hardness of 35–45 after 24 hours.

EXAMPLE XI

A blend consisting of 12.5 grams of the fluid dithiol resin of Example VIII, 50 grams of Bisphenol A-epichlorohydrin epoxy resin having an epoxy equivalent weight of about 190 and 5 grams of tri(dimethylaminomethyl) phenol was cured at 100° C. in a forced draft oven for 70 hours. The Barcol hardness of the cured blend was 43–45 and the flexural deformation temperature (at 264 p.s.i. loading) was 69° C. The blend was found to be an excellent adhesive.

EXAMPLE XII

A blend was prepared at ambient room temperature consisting of 20 grams of the liquid thiol resin of Example VI, 20 grams of the fluid epoxy resin employed in Example X and 2 grams of tri(dimethylaminomethyl) phenol. A 5-mil film of this resin blend was applied to tin plate and after curing overnight (about 12 hours) the result was a tough, clear coating which passed 60 in. lbs. Gardner impact.

The fluid dithiol resins of Examples VII and IX were employed as in the preceding examples for curing epoxy resins. The epoxy resin was the same resin employed in Examples X, XI and XII and the catalyst, tri(dimethylaminomethyl) phenol was employed in an amount of 10% by weight based on the epoxy resin employed. The results can be seen from the following table:

| Sulfhydryl resin of example | VII | IX | | |
|---|---|---|---|---|
| | | a | b | c |
| Ratio of sulfhydryl to epoxy resin | 2:1 | 1:3 | 1:1 | 2:1 |
| Gel time at 120° C. (minutes) | | 10 | 11 | 16 |
| Shore hardness* (ASTM D 1709–59T) | 80–85A | 82–91D | 73–80D | 75–90A |
| Tensile strength (p.s.i.) at room temp. (ASTM D 1708–59T) | 420 | 5,861 | 1,821 | 242 |
| Percent elongation at room temp. (ASTM D 1708–59T) | 137 | 6 | 40 | 115 |

*Shore D or A hardness as indicated by letter.

The foregoing data illustrates generally the type of products provided by the present invention. A wide variety of properties are attainable dependent on the amounts of materials employed and the curing conditions. The sulfhydryl resin is preferably employed in an amount of from 0.5 to 3 parts by weight per part of epoxy resin, dependent on the properties desired.

The embodiments of the invention in which an exclusive property or privilege is claimed are defined as follows:

1. A sulfhydryl resin selected from the group consisting of (A)  HS—R—OOC—D—COO—R—SH and (B) 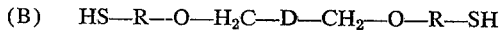 HS—R—O—H₂C—D—CH₂—O—R—SH where D is the divalent hydrocarbon radical of the dimer of a monocarboxylic acid having 8 to 24 carbon atoms and R is a hydroxyl substituted divalent alkylene radical having from 3 to 6 carbon atoms.

2. A sulfhydryl resin selected from the group consisting of (A) 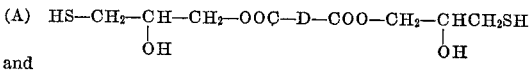 HS—CH₂—CH—CH₂—OOC—D—COO—CH₂—CHCH₂SH
       OH                              OH and (B) 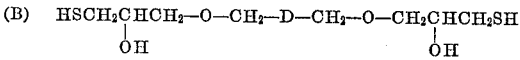 HSCH₂CHCH₂—O—CH₂—D—CH₂—O—CH₂CHCH₂SH
       OH                              OH where D is the divalent hydrocarbon radical of the dimer of a monocarboxylic acid having 8 to 24 carbon atoms.

3. A sulfhydryl resin as defined in claim 2 wherein said monocarboxylic acid has 18 carbon atoms.

4. A sulfhydryl resin as defined in claim 2 wherein said monocarboxylic acid is oleic acid.

5. A sulfhydryl resin as defined in claim 2 where said monocarboxylic acid is linoleic acid.

6. A sulfhydryl resin as defined in claim 2 wherein said monocarboxylic acid is a mixture of oleic and linoleic acid.

7. A composition of matter comprising a polyepoxide and a sulfhydryl resin selected from the group consisting of (A)  HS—R—OOC—D—COO—R—SH and (B) 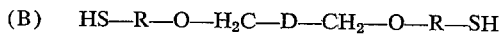 HS—R—O—H₂C—D—CH₂—O—R—SH where D is the divalent hydrocarbon radical of the dimer of a monocarboxylic acid having 8 to 24 carbon atoms and R is hydroxyl substituted divalent alkylene radical having from 3 to 6 carbon atoms.

8. A composition of matter comprising a polyepoxide having an epoxy equivalent weight of 140 to 2000 and a sulfhydryl resin selected from the group consisting of (A) 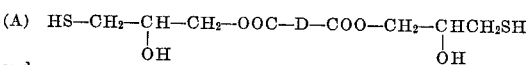 HS—CH₂—CH—CH₂—OOC—D—COO—CH₂—CHCH₂SH
       OH                              OH and (B) 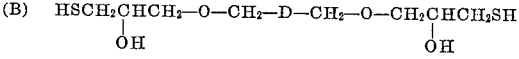 HSCH₂CHCH₂—O—CH₂—D—CH₂—O—CH₂CHCH₂SH
       OH                              OH where D is the divalent hydrocarbon radical of the dimer of a monocarboxylic acid having 8 to 24 carbon atoms.

9. A composition as defined in claim 8 wherein said polyepoxide is a polyglycidyl polyether of a polyhydric phenol.

10. A composition as defined in claim 8 wherein said monocarboxylic acid has 18 carbon atoms.

11. In a process of curing epoxy resins having more than one vicinal epoxy group comprising reacting said epoxy resin with from 0.5 to 3 parts by weight per part of epoxy resin of a sulfhydryl resin selected from the group consisting of (A) 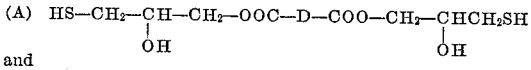 HS—CH₂—CH—CH₂—OOC—D—COO—CH₂—CHCH₂SH
       OH                              OH and (B) 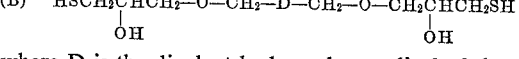 HSCH₂CHCH₂—O—CH₂—D—CH₂—O—CH₂CHCH₂SH
       OH                              OH where D is the divalent hydrocarbon radical of the dimer of a monocarboxylic acid having 8 to 24 carbon atoms.

References Cited

UNITED STATES PATENTS

| | | | |
|---|---|---|---|
| 3,361,723 | 1/1968 | Ephraim | 260—47 X |
| 3,355,512 | 11/1967 | DeAcetis et al. | 260—830 |
| 3,310,601 | 3/1967 | DeAcetis et al. | 260—830 X |
| 3,310,527 | 3/1967 | DeAcetis et al. | 260—830 |
| 3,278,496 | 10/1966 | LeFave et al. | 260—79 |
| 3,258,495 | 6/1966 | LeFave et al. | 260—609 |
| 2,633,458 | 3/1953 | Shokal | 260—834 |

DONALD E. CZAJA, *Primary Examiner.*

C. W. IVY, *Assistant Examiner.*

U.S. Cl. X.R.

260—830, 79, 399, 609, 47